(12) United States Patent
Washio

(10) Patent No.: US 11,082,595 B2
(45) Date of Patent: Aug. 3, 2021

(54) OPTICAL ELEMENT DRIVING DEVICE, CAMERA DEVICE AND ELECTRONIC APPARATUS

(71) Applicant: New Shicoh Motor Co., LTD, Zhejiang (CN)

(72) Inventor: Noriyuki Washio, Zhejiang (CN)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 0 days.

(21) Appl. No.: 16/927,428

(22) Filed: Jul. 13, 2020

(65) Prior Publication Data

US 2021/0033946 A1 Feb. 4, 2021

(30) Foreign Application Priority Data

Jul. 31, 2019 (CN) .......................... 201910702793.4

(51) Int. Cl.
*H04N 5/225* (2006.01)
*G03B 5/00* (2021.01)

(52) U.S. Cl.
CPC .............. *H04N 5/2254* (2013.01); *G03B 5/00* (2013.01); *H04N 5/2253* (2013.01); *H04N 5/2257* (2013.01); *G03B 2205/003* (2013.01); *G03B 2205/0069* (2013.01)

(58) Field of Classification Search
CPC .............. H04N 5/2254; H04N 5/2257; H04N 5/23283; G03B 5/00; G03B 2205/0023; G03B 2205/003; G02B 13/0065–007; G02B 27/64; G02B 27/646; G02B 2205/0023

See application file for complete search history.

(56) References Cited

U.S. PATENT DOCUMENTS

| 2020/0220956 | A1* | 7/2020 | Fujisaki | .............. H04M 1/0264 |
| 2020/0301160 | A1* | 9/2020 | Fujisaki | .................. G03B 5/00 |
| 2020/0310149 | A1* | 10/2020 | Kazuo | .................. G02B 27/646 |
| 2020/0333622 | A1* | 10/2020 | Fujisaki | ............. H02K 41/0356 |

FOREIGN PATENT DOCUMENTS

CN 107357114 A 11/2017

\* cited by examiner

*Primary Examiner* — Paul M Berardesca
(74) *Attorney, Agent, or Firm* — Hayes Soloway PC

(57) ABSTRACT

An optical element supporting device is provided that includes a fixed-side member, a first driving shaft, an intermediate member, a second driving shaft, a movable member and a driving mechanism. The first driving shaft extends in a first axis direction and is supported by the fixed-side member and the intermediate member is supported by the first driving shaft and rotates around the first axis with respect to the fixed-side member. The second driving shaft extends in a second axis direction orthogonal to the first axis direction and is supported by the intermediate member. The movable member is supported by the second driving shaft to rotate around the second axis with respect to the intermediate member and has a placing portion for placing an optical element. The driving mechanism applies a rotation force to the optical element that is placed on the movable member.

6 Claims, 4 Drawing Sheets

OPTICAL ELEMENT DRIVING DEVICE, CAMERA DEVICE AND ELECTRONIC APPARATUS

CROSS-REFERENCE TO RELATED APPLICATION

This application claims the benefit of Chinese patent application CN 201910702793.4, filed on Jul. 31, 2019, the contents of which are incorporated by reference herein.

TECHNICAL FIELD

The present disclosure relates to an optical element driving device, a camera device and an electronic apparatus used in an electronic apparatus such as a smartphone.

BACKGROUND

In a camera device installed in an electronic apparatus such as a smartphone, a lens body and a prism are provided in the optical path from a photographic subject to an image sensor, and the prism is tilted around two axes of a Y-axis and a Z-axis of an XYZ coordinate system. As a document disclosing a technique related to this type of camera device, Chinese publication CN107357114A (hereinafter referred to as "Patent Document 1") can be taken for example. In a prism driving device disclosed in Patent Document 1, an intermediate support is connected to the back surface of a prism supporting base having a tapered surface on which the prism is placed, via a second turning shaft extending in the Y-axis direction, a case is connected to the back surface of this intermediate support via a first turning shaft extending in the Z-axis direction, and the prism support is provided with a driving mechanism for generating a driving force in the directions around the Y-axis and the Z-axis.

However, since the technology in Patent Document 1 relates a to configuration in which the prism driving mechanism is attached to two side surfaces and a bottom surface of the prism supporting base, there was a problem that the first turning shaft and second turning shaft are each applied with a weight on only one side thereof, and a large driving force is required to drive the prism around the Y-axis and the Z-axis.

The present disclosure has been made in view of such problem, and an object of the present disclosure is to provide an optical element driving device, a camera device and an electronic apparatus capable of dual-axis tilting driving that does not require a large driving force.

SUMMARY

In accordance with a first aspect of the present disclosure, there is provided an optical element supporting device, including a fixed-side member, a first driving shaft, an intermediate member, a second driving shaft, a movable member and a driving mechanism. The first driving shaft extends in a first axis direction and is supported by the fixed-side member. The intermediate member is supported by the first driving shaft and rotates around the first axis with respect to the fixed-side member; The second driving shaft extends in a second axis direction orthogonal to the first axis direction and is supported by the intermediate member. The movable member is supported by the second driving shaft to rotate around the second axis with respect to the intermediate member, and has a placing portion for placing an optical element. The driving mechanism applies a rotation force to the optical element that is placed on the movable member. A portion of the driving mechanism is attached to the movable member on a side opposite to the placing portion with the first driving shaft and the second driving shaft sandwiched therebetween in a third axis direction orthogonal to the first axis direction and the second axis direction.

In accordance with a second aspect of the present disclosure, there is provided a camera device including the optical element driving device described above.

In accordance with a third aspect of the present disclosure, there is provided an electronic apparatus including the camera device described above.

DETAILED DESCRIPTION

Figure 1:
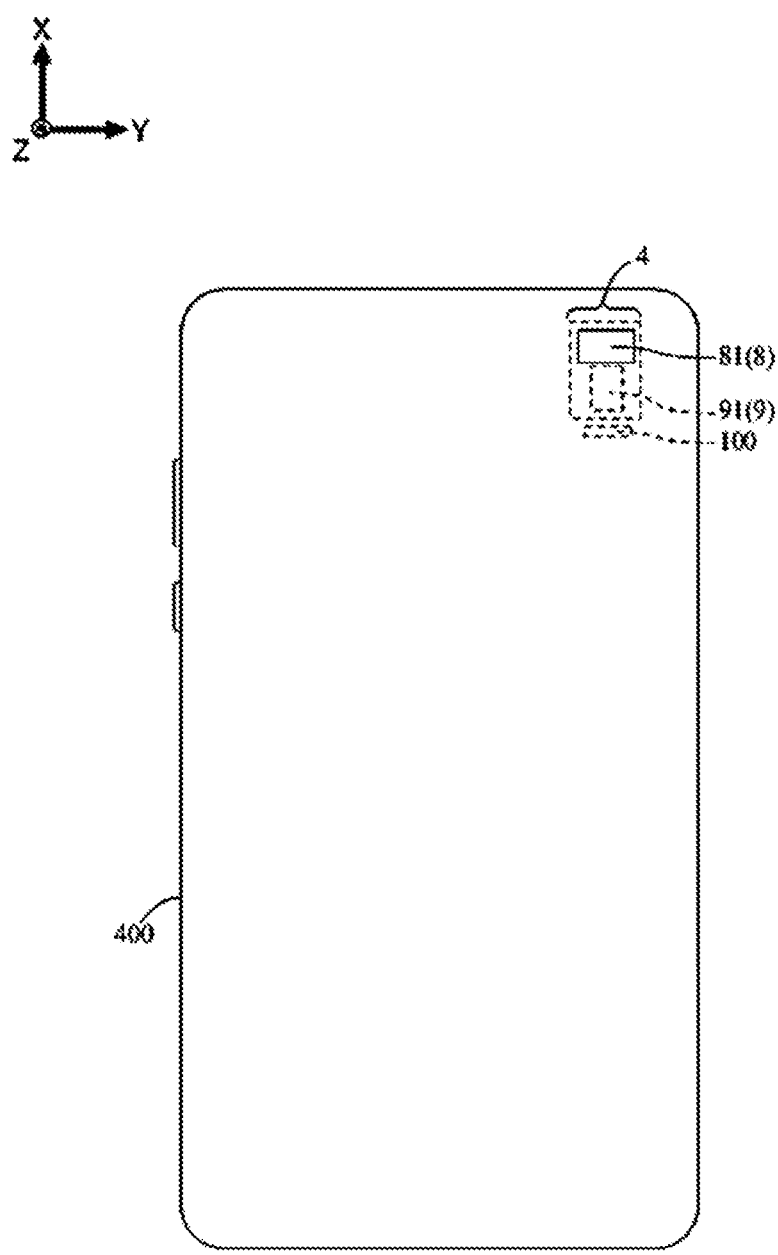
FIG. 1 is a front view of a smartphone 400 which is an electronic apparatus mounted with a camera device 4 including a prism driving device 8 according to one embodiment of the present disclosure.

Hereinafter, an embodiment of the present disclosure will be described with reference to the drawings. As shown in FIG. 1, a camera device 4 is embedded in the back surface of the housing of a smartphone 400.

The camera device 4 includes: a prism 81 and a lens body 91 serving as optical elements; an image sensor 100 that photoelectrically converts light guided from a photographic subject through the prism 81 and the lens body 91; a prism driving device 8 serving as a first optical element driving device that drives the prism 81; and a lens driving device 9 serving as a second optical element driving device that drives the lens body 91. The light that has entered the prism 81 from the photographic subject is bent by the prism 81, passes through the lens body 91, and enters the image sensor 100.

Here, a lens single body or a lens barrel in which a lens single body is incorporated is collectively referred to as a lens body 91. The optical axis of the lens single body corresponds to the optical axis of the lens body 91. In a rectangular coordinate system with an X-axis, a Y-axis, and a Z-axis that are orthogonal to each other, an axis through which the optical axis of the lens body 91 passes is set as the X-axis, a direction parallel to the X-axis is referred to as an X-axis direction. Similarly, a direction parallel to the Y-axis is referred to as a Y-axis direction, and a direction parallel to the Z-axis is referred to as a Z-axis direction. Light from the photographic subject enters the prism 81 from the Z-axis direction. Further, in the X-axis direction, a side where the prism 81 is located as viewed from the lens body 91 is referred to as an upper side and the opposite side where the image sensor 100 is located is referred to as a lower side. In the Z-axis direction, a side of the photographic subject as viewed from the prism 81 is referred to as a front side and the opposite side is referred to as a rear side.

Figure 2A:
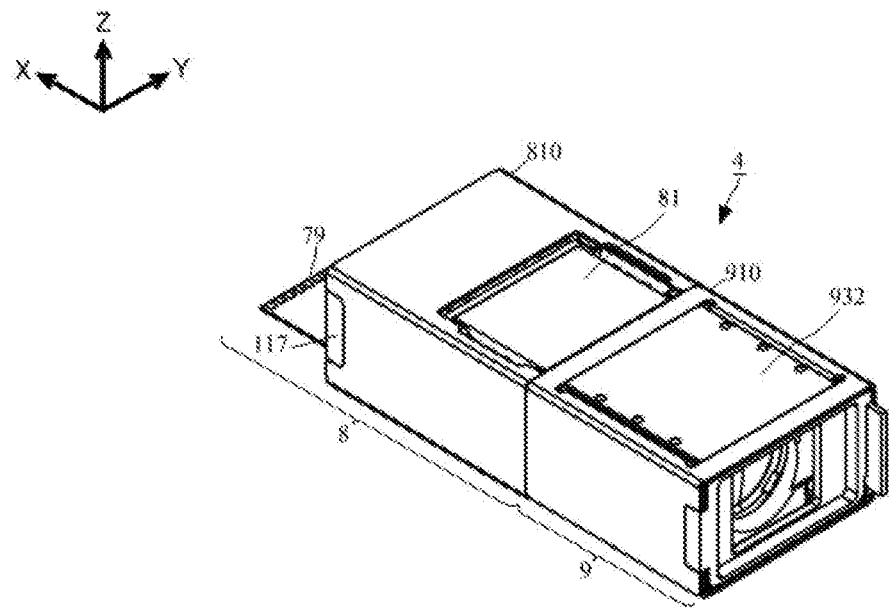
FIG. 2A is a perspective view of the camera device 4 including the prism driving device 8 of FIG. 1.
Figure 2B:
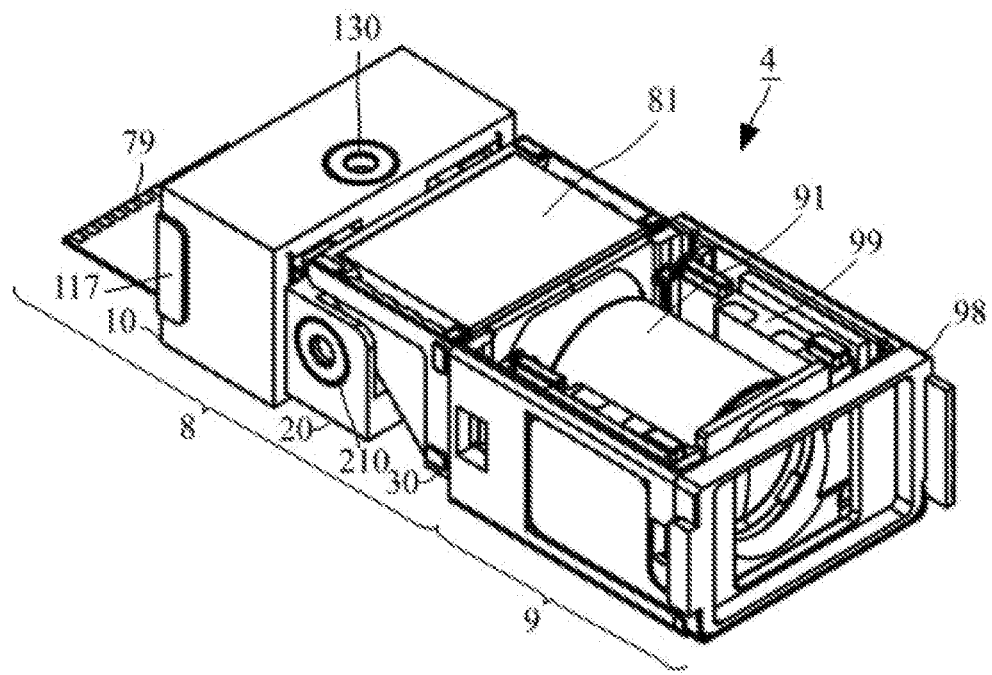
FIG. 2B shows the inside of cases 810 and 910 of FIG. 2A.
Figure 3:
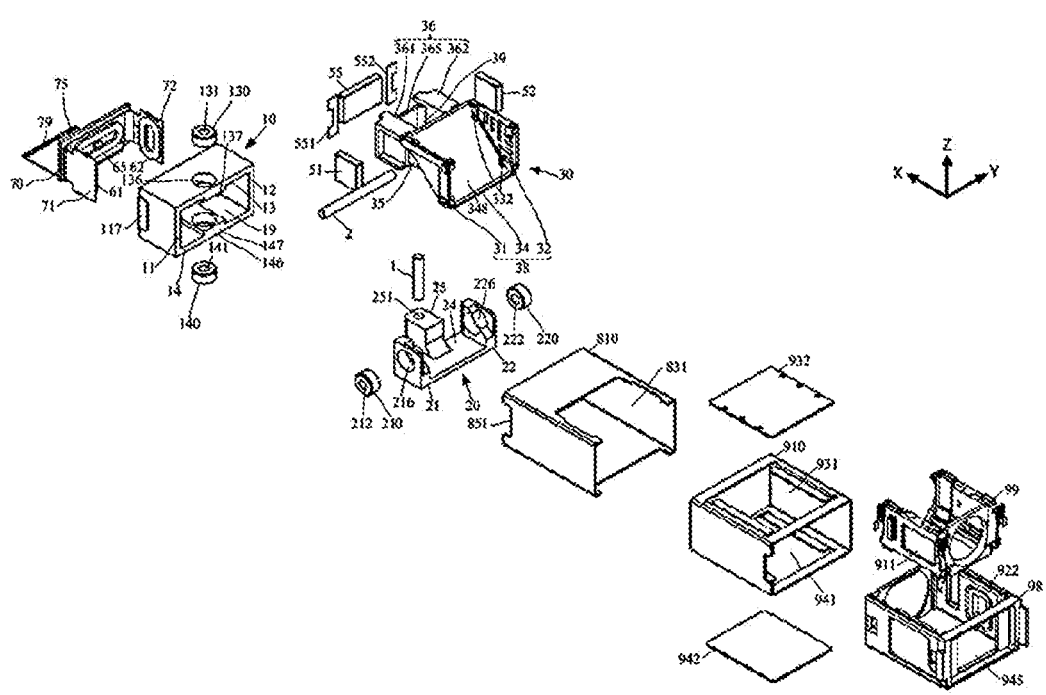
FIG. 3 is an exploded view of FIG. 2A.
Figure 4:
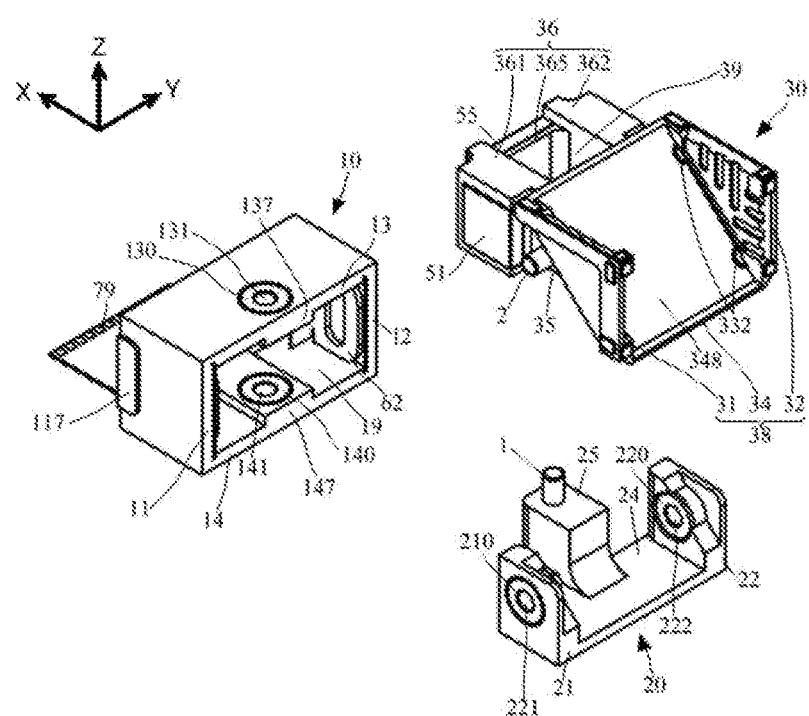
FIG. 4 shows a first member 10, a FPC79, first supporting bearings 130 and 140, a first driving shaft 1, a second member 20, second supporting bearings 210 and 220, a second driving shaft 2, and a third member 30 of FIG. 3.

As shown in FIGS. 2A and 2B and FIG. 3, a prism driving device 8 and a lens driving device 9 of the camera device 4 are arranged side by side in the X-axis direction. The lens driving device 9 is configured by accommodating a frame body 98, a lens holder 99, a magnet 911 and a coil 922 inside a case 910. The case 910 of the lens driving device 9 has a hollow rectangular parallelepiped shape. The upper side surface and lower side surface of the case 910 are open. The front side surface and rear side surface of the case 910 are formed with rectangular openings 931 and 941. A plate 932 is attached to the opening 931 and a plate 942 is attached to the opening 941.

A box-shaped frame body 98 is housed in the case 910, a box-shaped lens holder 99, which is one size smaller than the frame body 98, is housed in the frame body 98, and the lens holder 99 is elastically supported by the frame body 98 through a plate spring. The image sensor 100 is attached to an opening portion 945 on the lower side of the frame body 98. The lens body 91 is accommodated and held in the lens holder 99. A coil 922 and a magnet 911 are provided so as to face each other on internal wall surfaces on both sides in the Y-axis direction of the frame body 98 and external wall surfaces on both sides in the Y-axis direction of the lens holder 99.

When an electric current flows through the coil 922, a driving force in the X-axis direction is generated by an electromagnetic action between the coil 922 and the magnet 911, and the lens holder 99 moves in the X-axis direction together with the lens body 91.

The prism driving device 8 is configured by accommodating a first driving shaft 1, a second driving shaft 2, a first member 10, a second member 20, a third member 30, and a driving mechanism inside the case 810. The first driving shaft 1 is connected to the first member 10 via the first supporting bearings 130, 140. The second driving shaft 2 is connected to the second member 20 via the second supporting bearings 210, 220. The driving mechanism is configured by coils 61, 62 and 65 respectively facing magnets 51, 52 and 55. The coils 61, 62 and 65 are supplied with electric current via a FPC 79. The case 810, the first member 10, the FPC79, and the first supporting bearings 130 and 140 correspond to fixed-side members, the third member 30 corresponds to a movable member, and the second member 20 and the second supporting bearings 210 and 220 correspond to intermediate members.

The case 810 of the prism driving device 8 has a hollow rectangular parallelopiped shape with a dimension in the X-axis direction slightly longer than the case 910. The upper side and the lower side surfaces of the case 810 are entirely open. Further, the lower half of the front side surface is opened continuously as an opening portion 831 from the lower side surface. Further, a portion of the left side surface and the right side surface that are continuous with the upper side surface of the case 810 is open as an opening portion 851.

The first member 10 has a hollow box shape surrounded by wall portions 11, 12, 13, and 14 that are thicker than the case 810. The upper side surface and the lower side surface in the X-axis direction of the first member 10 are open. The centers of the inner side surfaces of the wall portions 13 and 14 of the first member 10 that face each other in the Z-axis direction protrude inward as convex portions 137 and 147. The convex portions 137 and 147 extend along the X-axis direction. The wall portions 13 and 14 are bored with through holes 136 and 146 piercing between the outer side surfaces thereof and the inner side surfaces of the convex portions 137 and 147. The edge portions on the upper sides of the outer surfaces of the wall portions 11 and 12 that face each other in the Y-axis direction of the first member 10 protrude outward as convex portions 117, and the convex portions 117 fit into the opening portions 851 when the first member 10 is incorporated in the case 810.

First supporting bearings 130 and 140 are mounted on the through holes 136 and 146 of the first member 10, and a reinforcing plate 70 is housed in a space 19 surrounded by the wall portions 11, 12, 13, and 14. The first supporting bearings 130 and 140 have a cylindrical shape with the same diameter as the through holes 136 and 146. The first supporting bearings 130 and 140 are bored with supporting holes 131 and 141 that are slightly larger in diameter than the first driving shaft 1.

FPC79 is bent so that its outline has a U shape as viewed from the Z-axis direction, and includes a first coil-supporting portion 71, a second coil-supporting portion 72, and a third coil-supporting portion 75 connecting the first coil-supporting portion 71 and the second coil-supporting portion 72. The first coil-supporting portion 71 and the second coil-supporting portion 72 are provided along the inner surfaces of two wall portions 11 and 12 of the first member 10. The third coil supporting portion 75 closes the upper side surface of the first member 10 in the X-axis direction, and the outer side surface of the third coil supporting portion 75 is fixed to the reinforcing plate 70. Coils 61, 62, 65 are respectively attached to the inner side surfaces of the first coil supporting portion 71, the second coil supporting portion 72 and the third coil-supporting portion 75. The coil 61 forms a set with a magnet 51, the coil 62 forms a set with a magnet 52, and the coil 65 forms a set with a magnet 55. The coils 61, 62 and 65, together with the magnets 51, 52 and 55, serve as a driving mechanism that applies rotation forces around the Y-axis and the Z-axis to the prism 81 placed on the placing base 332 of the third member 30.

The FPC79 extends to the outside from the rear end of the third coil-supporting portion 75 in the Z-axis direction and is exposed to the outside of the case 810. The FPC79 functions as a path for supplying an electric current to the coils 61, 62 and 65.

The second member 20 is provided with a supporting base 25 for supporting the first driving shaft 1 at the center of the front surface of the bottom plate 24, and two wall portions 21 and 22 for supporting the second driving shaft 2 on both end sides in the Y-axis direction. The supporting base 25 protrudes toward the front upper side, and a portion of the upper side of the supporting base 25 protrudes toward the upper side of the bottom plate 24 as viewed from the Z-axis direction. The supporting base 25 is bored with a vertical hole 251. The vertical hole 251 penetrates a portion of the supporting base 25 protruding toward upper side of the bottom plate 24 from its front surface to its rear surface.

Through holes 216 and 226 are bored at the centers of the wall portions 21 and 22. The surfaces of the wall portions 21 and 22 facing the inner sides of the corners on the front lower side are provided with recessed portions obtained by cutting out to a shape of rectangular equilateral triangle. A portion of the prism supporting portion 38 of the third member 30 is accommodated in this recessed portion.

Second supporting bearings 210 and 220 are mounted to the through holes 216 and 226 of the second member 20. The second supporting bearings 210 and 220 have a cylindrical shape with the same diameter as the through holes 216 and 226. The second supporting bearings 210 and 220 are bored with supporting holes 212 and 222 that are slightly larger in diameter than the second driving shaft 2.

The third member 30 are provided with a prism supporting portion 38 and a magnet supporting portion 36 on the lower side and the upper side of the shaft supporting portion 35 for supporting the second driving shaft 2. The shaft supporting portion 35 has a shape of rectangular equilateral triangular column, and the left and right end surfaces of the shaft supporting portion 35 are bored with a horizontal hole (not shown). The horizontal hole of the shaft supporting portion 35 penetrates the shaft supporting portion 35 between both side surfaces thereof in the Y-axis direction.

The prism supporting portion 38 has two wall portions 31 and 32 facing each other in the Y-axis direction, and a bottom plate 34 interposed between the wall portions 31 and 32. The two wall portions 31 and 32 are in a shape of rectangular equilateral triangle. The end surface 348 of the bottom plate 34 is a tapered surface that faces toward a direction of the front lower side to intersect a plate parallel to the X-Y plate at 45°, and corresponds to the bottom side portion of the rectangular equilateral triangle in the shaft supporting portion 35. The surface of the bottom plate 34 on the back side of the end surface 348 is connected to the shaft supporting portion 35. An end portion of the end surface 348 of the bottom plate 34 on the wall portion 21 side and another end portion of the end surface 348 of the bottom plate 34 on the wall portion 22 side are each provided with two placing bases 332. The placing base 332 has a semicircular shape as viewed from the normal line direction of the end surface 348.

The prism 81 is placed on the placing base 332 of the prism supporting portion 38 with its reflection surface facing the end surface 348 of the prism supporting portion 38. The placing base 332 is a placing portion on which an optical element is placed. The side surface of the prism 81 in the Y-axis direction is viscously attached to the inner side surface of the wall portions 31 and 32 of the prism supporting portion 38. The incident surface of the prism 81 on which the light from the photographic subject is incident is exposed from the opening portion 831.

The magnet supporting portion 36 has two base portions 361 and 362 that extend from the shaft supporting portion 35 to the upper side in the X-axis direction and face each other in the Y-axial direction, and a horizontal plate 365 sandwiched by the base portions 361 and 362. The horizontal plate 365 is bridged at a position away from the shaft supporting portion 35 to the upper side. The magnet supporting portion 36 is formed with a space 39 that is surrounded by the base portions 361 and 362, the horizontal plate 365, and the shaft supporting portion 35. The supporting base 25 of the second member 20 is accommodated in the space 39.

The base portions 361 and 362, and the outer side surface of the horizontal plate 365 are formed with magnet accommodating portions, and the magnets 51 and 52, and magnet 55 are accommodated and fixed, respectively. The magnets 51, 52, and 55 face the coils 61, 62, and 65, respectively.

Further, the plate springs 551 and 552 are connected and fixed to the first member 10 with the left end and the right end of the upper end of the magnet supporting portion 36 in the X-axis direction. As a result, the third member 30 is elastically supported with respect to the first member 10.

The first driving shaft 1 is a rod body that extends in the Z-axis direction. The second driving shaft 2 is a rod body that extends in the Y-axis direction. The first driving shaft 1 is supported by the first member 10 via the first supporting bearings 130 and 140, and the second driving shaft 2 is supported by the second member 20 via the second supporting bearings 210 and 220. The second member 20 is supported by the first driving shaft 1 and is connected to the first member 10 so as to be rotatable around the Z-axis with respect to the first member 10. The third member 30 is supported by the second driving shaft 2 and is connected to the second member 20 so as to be rotatable round the Y-axis with respect to the second member 20.

More specifically, the supporting base 25 of the second member 20 is housed in the space 39 from the rear side of the third member 30. The center portion of the second driving shaft 2 is inserted and viscoelastically fixed into the horizontal hole of the shaft supporting portion 35 of the third member 30. Further, two end portions of the second driving shaft 2 in the Y-axis direction are inserted into the supporting hole 212 of the second supporting bearing 210 and the supporting hole 222 of the second supporting bearing 220. A resin having viscoelasticity is filled between the outer peripheral surface of the second driving shaft 2 and the inner peripheral surfaces of the supporting holes 212 and 222. The resin with viscoelasticity has an effect as a so-called damper.

The magnet supporting portion 36, which accommodates the supporting base 25 in the space 39, is accommodated in the space 19 of the first member 10. The center portion of the first driving shaft 1 is inserted and viscoelastically fixed into the vertical hole 251 of the supporting base 25 of the second member 20. Two end portions of the first driving shaft 1 in the Z-axis direction are inserted into the supporting hole 131 of the first supporting bearing 130 and the supporting hole 141 of the first supporting bearing 140. A resin with viscoelasticity is filled between the outer peripheral surface of the first driving shaft 1 and the inner peripheral surfaces of the supporting holes 131 and 141.

In the space 19 of the first member 10, the coils 61, 62, and 65, which are a portion of the driving mechanism, are arranged on the FPC79, which corresponds to a fixed-side member, and the magnets 51, 52, and 55, which are a portion of the driving mechanism, are arranged on the third member 30, which corresponds to a movable member. Each set of the magnets 51, 52, and 55 and the coils 61, 62, and 65 face each other with a slight space therebetween, respectively.

In this state, in the X-axis direction, the two axes of the first driving shaft 1 and the second driving shaft 2 intersect each other in a cross shape at a slight interval in the X-axis direction between the placing base 332 of the prism supporting portion 38, which is the placing portion, and the magnet supporting portion 36 supporting the magnet 55, which is a portion of the driving mechanism. Further, in the X-axis direction, the magnet 55 is on the opposite side of the placing base 332 with the first driving shaft 1 and the second driving shaft 2 sandwiched therebetween. Further, the magnets 51 and 52 that form a portion of the driving mechanism are located at positions remote from each other on both sides in the Y-axis direction with the first driving shaft 1 sandwiched therebetween.

When an electric current flows though the coils 61 and 62, a rotation force around the Z-axis is generated by the occurrence of the electromagnetic action between the coils 61 and 62 and the magnets 51 and 52 Due to the rotation force, the second member 20, the third member 30, and the prism 81 placed on the placing base 332 of the third member 30 rotate around the Z-axis with respect to the first member 10. Further, when an electric current flows through the coil 65, a rotation force around the Y-axis is generated by the occurrence of the electromagnetic action between the coil 65 and the magnet 55. Due to the rotation force, the third member 30, and the prism 81 placed on the placing base 332 of the third member 30 rotate around the Y-axis with respect to the second member 20.

The magnet 55 is attached to the horizontal plate 365 of the magnet supporting portion 36 of the third member 30 on the side opposite to the placing base 332 of the third member 30 with the first driving shaft 1 and the second driving shaft 2 sandwiched therebetween in the X-axis direction. Therefore, in the first driving shaft 1, the weights of the members on both sides of the X-axis direction are balanced, and the force required to drive the rotation direction of the first driving shaft 1 of the prism 81, which is an optical element, is small. Further, in the second driving shaft 2, the weights of the members on both sides of the X-axis direction are balanced, and the force required to drive the rotation direction of the second driving shaft 2 of the prism 81, which is an optical element, is small.

The configuration of the present embodiment can be restated as follows. The Z-axis direction is set as a first axis direction, the Y-axis direction is set as a second axis direction, and the X-axis direction is set as a third axis direction. The prism driving device 8, which is an optical element driving device, includes: a first member 10 corresponding to a fixed-side member, and first supporting bearings 130 and 140; a first driving shaft 1; a second member 20 corresponding to an intermediate member, and second supporting bearings 210 and 220; a second driving shaft 2; a third member 30 corresponding to a movable member; magnets 51, 52 and 55 and coils 61, 62 and 65, which serve as a driving mechanism. The first driving shaft 1 extends in the first axis direction and is supported by the fixed-side member. The intermediate member is supported by the first driving shaft 1 and rotates around the first axis with respect to the fixed-side member. The second driving shaft 2 extends in the second axis direction and is supported by the intermediate member. The movable member is supported by the second driving shaft 2 and rotates around the second axis with respect to the intermediate member. The movable member has a placing base 332, which is a placing portion, on the side opposite to the first driving shaft 1 with the second driving shaft 2 sandwiched therebetween. The prism 81, which is an optical element, is placed on the placing portion. The driving mechanism applies a rotation force to the optical element placed on the movable member. The magnet 55, which is a portion of the driving mechanism, is attached to the movable member on the side opposite to the placing portion with the first driving shaft 1 and the second driving shaft 2 sandwiched therebetween in the third axis direction.

With this configuration, in both the first driving shaft 1 and the second driving shaft 2, the prism 81, which is the optical element, is provided on one side in the third axis direction, and the magnet 55, which is a portion of the driving mechanism, is provided on the opposite side. As a result, the force that is required to drive the rotation direction of the first driving shaft 1 and the second driving shaft 2 of the optical element is small. Therefore, it is possible to provide a device capable of dual-axis tilting driving that does not require a large driving force.

In the present embodiment of this configuration, the placing portion is arranged on the side opposite to the first driving shaft 1 with the second driving shaft 2 sandwiched therebetween, but it may be configured in such a way that the placing portion is arranged on the side opposite to the second driving shaft 2 with the first driving shaft 1 sandwiched therebetween. Further, the first axis may be the Y-axis and the second axis may be the Z-axis. That is, it may be configured in such a way that the first driving shaft 1 extends in the Y-axis direction and is supported by the fixed-side member, and the second driving shaft 2 extends in the Z-axis direction and is supported by the intermediate member. At this time, the intermediate member rotates around the Y-axis with respect to the fixed-side member, and the movable member rotates around the Z-axis with respect to the intermediate member. Even in such a configuration, any one of the positions of the first driving shaft 1 and the second driving shaft 2 in the X direction may be on the upper side. In this case, it is desirable that the magnets 51 and 52 are provided at positions facing to each other in the Y-axis direction with the second driving shaft 2 extending in the Z-axis direction sandwiched therebetween.

It is to be noted that, in the present embodiment, the magnets 51 and 52 may be attached to the third member 30 at positions where not the second driving shaft 2 but the first driving shaft 1 is sandwiched.

It is to be noted that, in the present embodiment, as a portion of the driving mechanism of the prism driving device 8, the coil 65 may be attached to the movable member, and the magnet 55 may be attached to the fixed-side member.

Further, in the present embodiment, the first driving shaft 1 is rotatably supported by the fixed-side member and fixedly supports the intermediate member. The second driving shaft 2 is rotatably supported by the intermediate member and fixedly supports the movable member. However, this may be reversed. That is, the first driving shaft 1 is fixedly supported by the fixed-side member and rotatably supports the intermediate member. The second driving shaft 2 may be fixedly supported with respect to the intermediate member, and the movable member may be rotatable. At this time, resin with viscoelasticity is filled between the outer peripheral surface of the first driving shaft 1 in the vertical hole 251 of the prism driving device 8 and the inner peripheral surface of the vertical hole 251, and a viscoelastic agent is filled between the outer peripheral surface of the first driving shaft 1 and the inner peripheral surfaces of the supporting holes 131 and 141. Further, a resin with viscoelasticity may be filled between the outer peripheral surface of the second driving shaft 2 in the horizontal hole and the inner peripheral surface of the horizontal hole, and a viscoelastic agent may be filled between the outer peripheral surface of the second driving shaft 2 and the inner peripheral surfaces of the supporting holes 212 and 222.

What is claimed is:

1. An optical element driving device comprising:
   in a rectangular coordinate system having a first axis, a second axis and a third axis that are orthogonal to each other,
   a fixed-side member;
   a first driving shaft which extends in the first axis direction and is supported by the fixed-side member;
   an intermediate member which is supported by the first driving shaft and rotates around the first axis with respect to the fixed-side member;
   a second driving shaft which extends in the second axis direction and is supported by the intermediate member;
   a movable member which is supported by the second driving shaft, rotates around the second axis with respect to the intermediate member, and has a placing portion for placing an optical element; and
   a driving mechanism applying a rotation force to the optical element that is placed on the movable member,
   wherein a portion of the driving mechanism is attached to the movable member on a side opposite to the placing portion with the first driving shaft and the second driving shaft sandwiched therebetween in the third axis direction.

2. The optical element driving device according to claim 1, wherein the driving mechanism comprises a magnet and a coil, the magnet is attached to the movable member, and the coil faces the magnet and is attached to the fixed-side member.

3. The optical element driving device according to claim 2, wherein the driving mechanism further comprises two sets of magnets and coils, the two sets of magnets are attached to the movable member at positions where one of the first driving shaft and the second driving shaft is sandwiched therebetween, and the two sets of coils face each set of magnets and are attached to the fixed-side member.

4. The optical element driving device according to claim 1, wherein the first driving shaft and the second driving shaft intersect each other in a cross shape at an interval in the third axis direction between the placing portion and a portion of the driving mechanism.

5. A camera device comprising the optical element driving device according to claim 1.

6. An electronic apparatus comprising the camera device according to claim 5.

* * * * *